US010897330B2

(12) United States Patent
Chen et al.

(10) Patent No.: US 10,897,330 B2
(45) Date of Patent: *Jan. 19, 2021

(54) METHODS FOR REPETITION DESIGN

(71) Applicant: HFI Innovation Inc., Hsinchu County (TW)

(72) Inventors: Hua-Min Chen, Beijing (CN); Min Wu, Beijing (CN); Tao Chen, Beijing (CN)

(73) Assignee: HFI Innovation INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/440,984

(22) Filed: Jun. 14, 2019

(65) Prior Publication Data

US 2019/0296865 A1 Sep. 26, 2019

Related U.S. Application Data

(63) Continuation of application No. 15/613,467, filed on Jun. 5, 2017, now Pat. No. 10,361,820, which is a (Continued)

(51) Int. Cl.
*H04L 1/04* (2006.01)
*H04L 1/18* (2006.01)
(Continued)

(52) U.S. Cl.
CPC .......... *H04L 1/1825* (2013.01); *H04L 1/04* (2013.01); *H04L 1/08* (2013.01); *H04L 1/189* (2013.01);
(Continued)

(58) Field of Classification Search
CPC ..... H04L 41/00; H04L 41/08; H04L 41/0803; H04L 1/1825; H04L 27/2613;
(Continued)

(56) References Cited

U.S. PATENT DOCUMENTS 10,361,820 B2 * 7/2019 Chen ................. H04L 1/189
2009/0279633 A1 11/2009 Lee et al. ............. 375/267
(Continued)

FOREIGN PATENT DOCUMENTS

CN 101425880 A 10/2007
CN 103795505 A 11/2012
(Continued)

OTHER PUBLICATIONS

International Search Report and Written Opinion of International Search Authority for PCT/CN2016/072841 dated Apr. 21, 2016 (11 pages).

EPO, Search Report for the EP patent application 16742812.7 dated Nov. 16, 2017 (8 pages).

*Primary Examiner* — Mohamed A Kamara
(74) *Attorney, Agent, or Firm* — Imperium Patent Works; Helen Mao

(57) ABSTRACT

Methods and apparatus are provided for repeated transmission. In one novel aspect, the RV sequence is selected from a predefined set of RV sequences for the repeated transmission. In one embodiment, the one or more RV values in the selected RV sequence are repeatedly used for the repeated transmission, by applying each RV value one by one to one block of repetitions cyclically, wherein the number of repetition in the block is determined by the repetition number and the length of the RV sequence. In another embodiment, the one or more RV values in the selected RV sequence are repeatedly used for the repeated transmission, by applying each RV value one by one to one repetition cyclically. In one embodiment, the RV value and the scrambling sequences are the same for the repetition blocks and a symbol level combination is applied.

18 Claims, 13 Drawing Sheets

Related U.S. Application Data continuation of application No. PCT/CN2016/072841, filed on Jan. 29, 2016.

(51) Int. Cl.
*H04L 1/08* (2006.01)
*H04L 27/26* (2006.01)

(52) U.S. Cl.
CPC .......... *H04L 1/1819* (2013.01); *H04L 1/1874* (2013.01); *H04L 27/2613* (2013.01)

(58) Field of Classification Search
CPC ....... H04L 1/1874; H04L 1/1819; H04L 1/08; H04L 1/04; H04L 1/189
See application file for complete search history.

(56) References Cited

U.S. PATENT DOCUMENTS

| | | | |
|---|---|---|---|
| 2009/0290559 A1 | 11/2009 | Pelletier et al. | 370/336 |
| 2011/0149883 A1 | 6/2011 | Baker | 370/329 |
| 2012/0069796 A1 | 3/2012 | Casaccia et al. | 370/328 |
| 2014/0066114 A1 | 3/2014 | Kwon et al. | 455/501 |
| 2015/0029970 A1 | 1/2015 | Niewczas et al. | 370/329 |
| 2015/0189546 A1 | 7/2015 | Earnshaw et al. | 370/329 |
| 2017/0019216 A1* | 1/2017 | Li | H04L 1/08 |
| 2018/0279341 A1* | 9/2018 | Yamada | H04L 1/08 |

FOREIGN PATENT DOCUMENTS

| | | |
|---|---|---|
| CN | 103338090 A | 5/2013 |
| WO | WO2014067469 A1 | 11/2012 |

\* cited by examiner

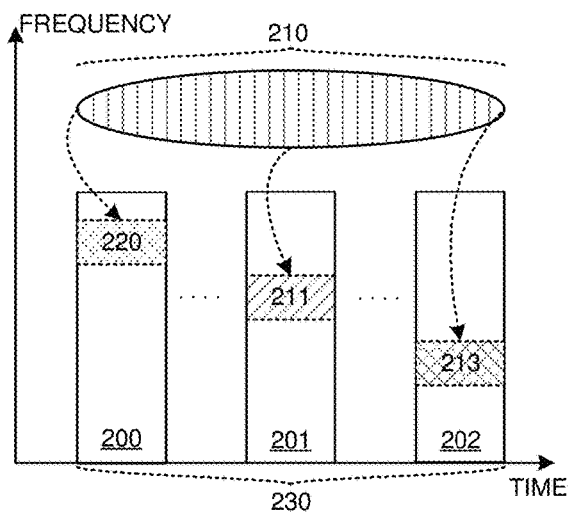
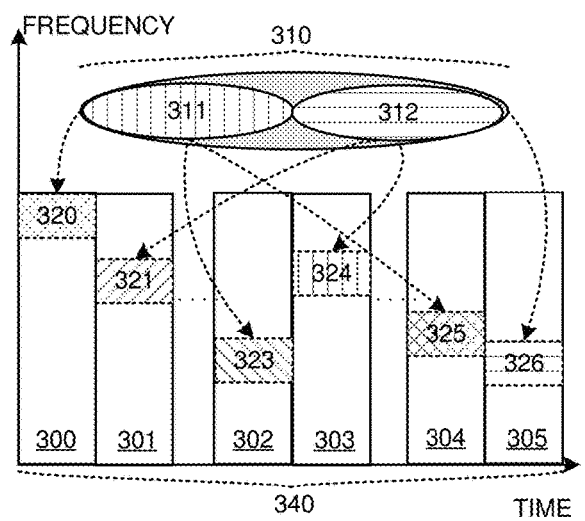
FIG. 2
FIG. 3
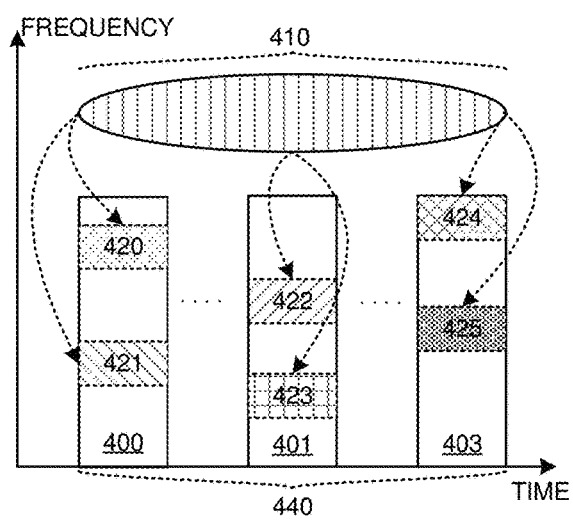
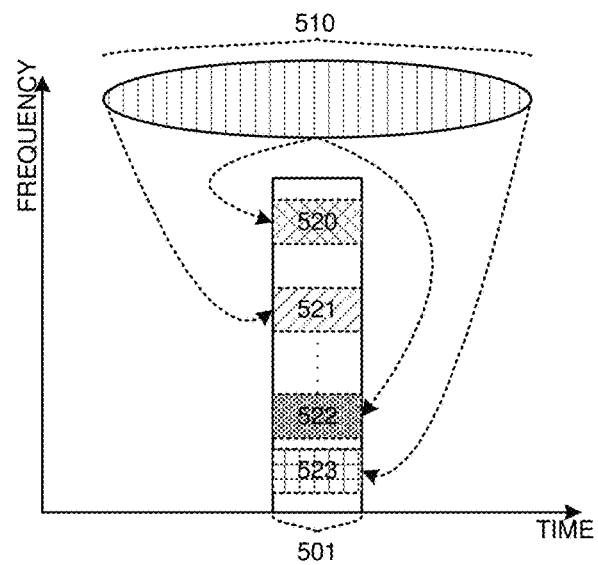
FIG. 4
FIG. 5

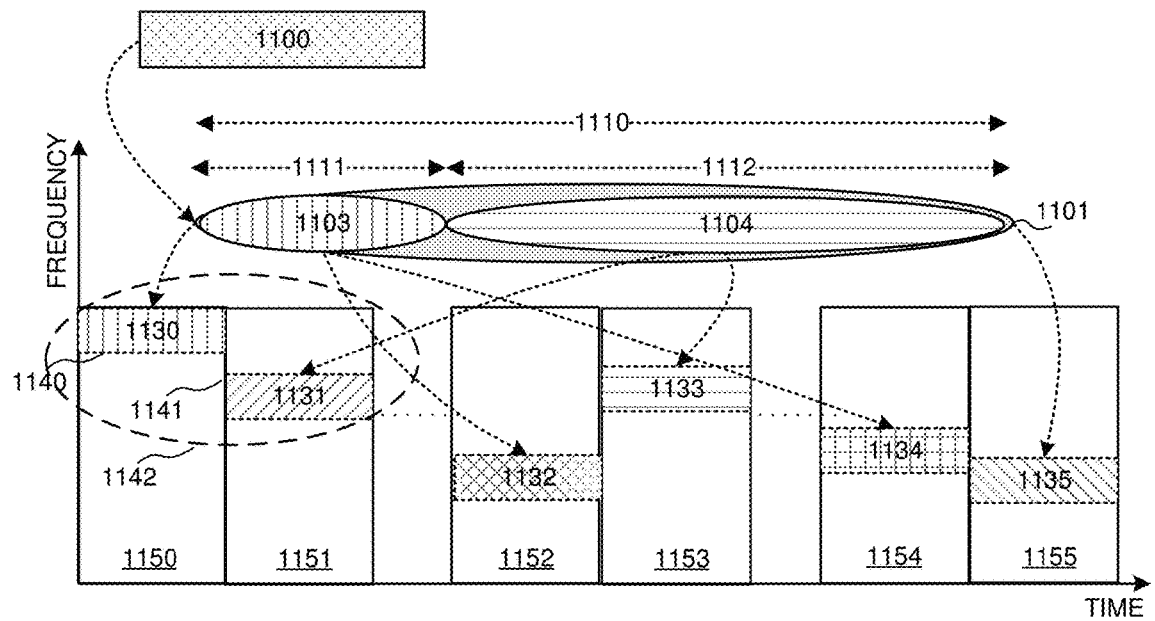
FIG. 11
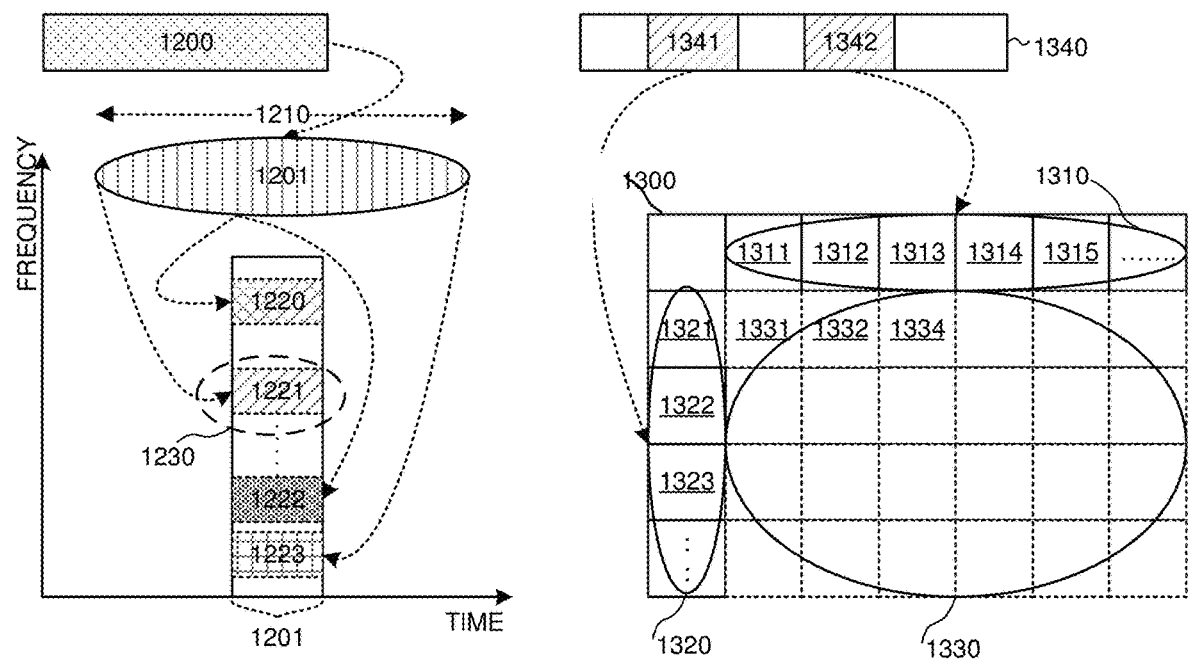
FIG. 12
FIG. 13

METHODS FOR REPETITION DESIGN

CROSS REFERENCE TO RELATED APPLICATIONS

This application is a continuation, and claims priority under 35 U.S.C. § 120 from nonprovisional U.S. patent application Ser. No. 15/613,467, entitled "METHODS FOR REPEITION DESIGN", filed on Jun. 5, 2017, the subject matter of which is incorporated herein by reference. Application Ser. No. 15/613,467, in turn, claims priority under 35 U.S.C. § 120 and § 365(c) from International Application No. PCT/CN2016/072841, with an international filing date of Jan. 29, 2016, which in turn claims priority from PCT Application No. PCT/CN2015/071973, entitled, "METHODS FOR REPETITION DESIGN" filed on Jan. 30, 2015. This application is a continuation of International Application PCT/CN2016/072841, which claims priority from PCT Application No. PCT/CN2015/071973. International Application PCT/CN2016/072841 is pending as of the filing date of this application, and the United States is a designated state in International Application PCT/CN2016/072841. This application claims the benefit under 35 U.S.C. § 119 from PCT Application No. PCT/CN2015/071973. The disclosure of each of the forgoing documents is incorporated herein by reference.

TECHNICAL FIELD

The disclosed embodiments relate generally to wireless communication, and, more particularly, to methods and apparatus for repetition design.

BACKGROUND

Third generation partnership project (3GPP) and Long Term Evolution (LTE) mobile telecommunication systems provide high data rate, lower latency and improved system performances. Such systems are optimized for regular data communications, wherein there is no need for repeatedly retransmissions. However, in some situations, repeatedly retransmissions are needed. For example, some UEs, in the basements of residential buildings or locations shielded by foil-backed insulation, metalized windows, or traditional thick-walled building construction, may experience significantly larger penetration losses on the radio interface than normal LTE devices. More resources/power is needed to support these UEs in the extreme coverage scenario. Repetition has been identified as a common technique to bridge the additional penetration losses than normal LTE devices. However, issues remain for the repeated transmission. For example, a same symbol sequence generated from an information packet is repeatedly transmitted in each repetition, or different symbol sequences generated from the information packet are transmitted within different repetitions. Further, whether there are multiple repetitions within one time block at time domain. A new mechanism for repeated transmissions or retransmissions is needed.

SUMMARY

Methods and apparatus are provided for repeated transmission. In one novel aspect, the RV sequence is selected from a predefined set of RV sequences for the repeated transmission. In one embodiment, the UE obtains or selects a RV sequence, the RV sequence configures each repetition for repeatedly transmitted information packets, wherein the RV values included in the RV sequence are selected for each repeated transmission. The UE determines a repetition time interval (RTI) length for the repeatedly transmitted information packets. The UE receives information packets from a base station, wherein the information packets are transmitted repeatedly by a repetition number, and wherein a RV value is selected from a preconfigured RV sequence for each repeated transmission. The UE combines received each repetition of the information packets and decoding the information packets based on the repetition configuration.

In one embodiment, the one or more RV values in the selected RV sequence are repeatedly used for the repeated transmission, by applying each RV value one by one to one block of repetitions cyclically, wherein the number of repetition in the block is determined by the repetition number and the length of the RV sequence. In another embodiment, the one or more RV values in the selected RV sequence are repeatedly used for the repeated transmission, by applying each RV value one by one to one repetition cyclically. In one embodiment, the RV value and the scrambling sequences are the same for the repetition blocks and a symbol level combination is applied.

In another one embodiment, the UE obtains the repetition configuration including one or more repetition parameters comprise a scrambling sequence, a RV value, a physical resource location, and a repetition type.

In one embodiment, a repeated transmission of an information packet can be implemented based on one time block in time domain. It means one repetition is performed within one time block and each repetition within one time block is self-decodable. Under such repetition mechanism, a repetition granularity in time domain is one time block. For easy description, a repetition time interval (RTI) is introduced. Under this embodiment, such repetition is based on a basic RTI with a length of one time block.

In a yet another embodiment, an information packet is repeatedly transmitted within a set of resources distributed to a plurality of time blocks, i.e., a subset of the information packet is transmitted in a subset of resources within each time block. Under this repetition mechanism, the RTI length is more than one time block and each transmission in one time block within a longer RTI is not self-decodable. Then, the receiver side can start to decode the information packet after the plurality of time blocks are received.

One of repetition mechanisms in above embodiments is an inter-repetition mechanism with a basic RTI or a longer RTI. To support one-shot transmission of an information packet within one time block and reduce delay in time domain, the information packet is repeatedly transmitted within one time block in a third embodiment. Further, such repetition also repeats within a plurality of time blocks in case that repetition within one time block cannot compensate a coverage loss. Different from the inter repetition based on one or more time blocks, there are multiple repetitions of the information packet within one time block and it can be regarded as an intra repetition mechanism. Such repetition mechanism can improve power consumption at the receiver side due to a smaller latency. Further, scheduling at network will be simpler since connected devices with a coverage loss can be served in a time-domain multiplexing scheme under such one shot transmission, considering connected devices are massive within a cell, and the size of the information packet is quite small.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 shows an illustration an exemplary diagram of a transmission of a repetition transmission of an information packet FIG. 3 illustrates an exemplary diagram of an inter repetition for a repetition transmission of an information packet.

FIG. 4 illustrates an exemplary diagram of in intra repetition across multiple time blocks for a repetition transmission of an information packet.

FIG. 5 illustrates an exemplary diagram of an intra repetition within one time block in accordance with embodiments of the current invention.

FIG. 11 shows an illustration example of signal regeneration under an inter repetition based on a longer RTI.

FIG. 12 shows an illustration example of signal generation under an intra repetition.

FIG. 13 shows an illustration example of determining a resource granularity under an intra repetition mechanism.

DETAILED DESCRIPTION

Reference will now be made in detail to some embodiments of the invention, examples of which are illustrated in the accompanying drawings.

Figure 1:
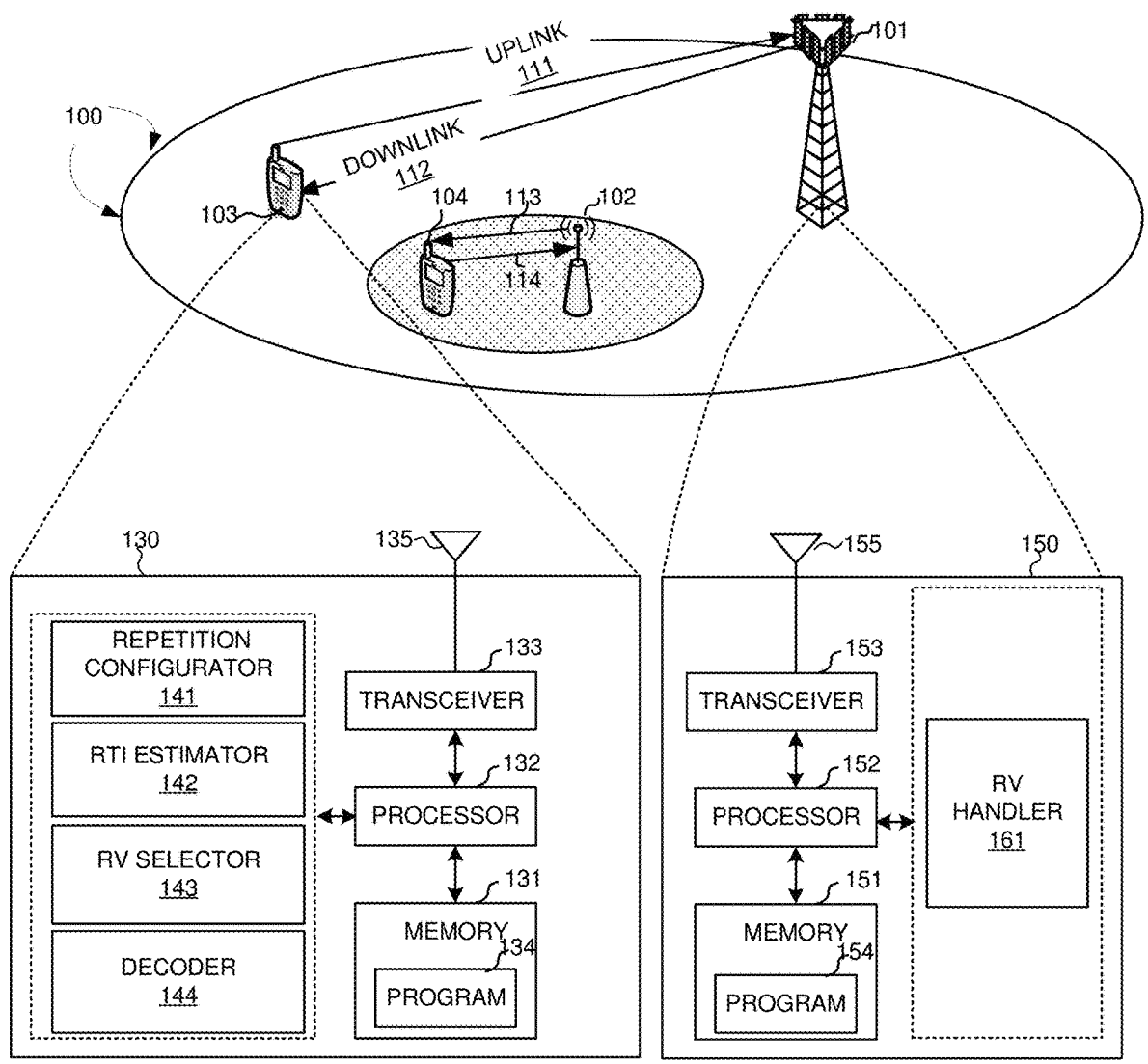
FIG. 1 is a block diagram illustrating a schematic diagram of a wireless communications system according to one embodiment of the present invention.

FIG. 1 is an exemplary block diagram illustrating a schematic diagram of a wireless communications system according to one embodiment of the present invention. A wireless communications system 100 includes one or more fixed base infrastructure units 101 and 102, forming one or more access networks distributed over a geographical region. The access network may be a Universal Terrestrial Radio Access Network (UTRAN) in the WCDMA technology or an E-UTRAN in the Long Term Evolution (LTE)/LTE-A technology. The base unit may also be referred to an access point, base station, Node-B, eNode-B, or other terminologies used in the art. In some systems, one or more base stations are communicably coupled to a controller forming an access network that is communicably coupled to one or more core networks.

In FIG. 1, one or more mobile stations 103 and 104 are connected wirelessly to base stations 101 and 102 for wireless service within a serving area, for example, a cell or within a cell sector. The mobile station may also be called as user equipment (UE), a wireless communication device, terminal or some other terminologies. Mobile station 103 sends uplink data to base stations 101 via uplink channel 111 in the time and/or frequency domain. Mobile station 104 sends uplink data to base stations 102 via uplink channel 114 in the time and/or frequency domain. The serving base stations 101 and 102 transmit downlink signals via a downlink channel 112 and 113 to mobile stations 103 and 104, respectively. In one embodiment, the communication system utilizes Orthogonal Frequency Division Multiplexing Access (OFDMA) or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remote units are served by assigning downlink or uplink radio resources that typically comprises a set of sub-carriers over one or more OFDM symbols. Exemplary OFDMA based protocols include the developing LTE/LTE-A of the 3GPP standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the communication system may utilize other cellular communication system protocols including, but not limited to, TDMA or direct sequence CDMA. The disclosure, however, is not intended to be limited to any particular wireless communication system.

In FIG. 1, wireless communication network 100 is an OFDM/OFDMA system comprising a base station eNB 101 and eNB 102, and a plurality of mobile station 103 and mobile station 104. When there is a downlink data block to be sent from base station to mobile station, each mobile station gets a downlink assignment, e.g., a set of radio resources in a physical downlink shared channel (PDSCH). When a UE needs to send an uplink data block to base station, the mobile station gets a grant from the base station that assigns a set of uplink radio resources. In 3GPP LTE system based on OFDMA downlink, the radio resource is partitioned into subframes each of which is comprised of two slots and each slot has seven OFDMA symbols in the case of normal Cyclic Prefix (CP). Each OFDMA symbol further consists of a number of OFDMA subcarriers depending on the system bandwidth. The basic unit of the radio resource grid is called Resource Element (RE), which spans an OFDMA subcarrier over one OFDMA symbol. One type of the basic block of the radio resources for scheduling in LTE is called physical resource block (PRB), each of which contains several consecutive OFDM symbols in one subframe and several consecutive subcarriers in frequency domain. Virtual resource blocks (VRB) is another type of the basic block of the radio resources definition in LTE system, which have two types: localized type and distributed type. For each virtual resource blocks, a pair of virtual resource blocks over two slots in a subframe is assigned together by a single virtual resource block number. One downlink assignment or an uplink grant consists of one or multiple basic blocks of the radio resources, e.g., a set of PRBs.

FIG. 1 further shows a simplified block diagram of base station 101 in accordance to the current invention. Base station 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in base station 101. Memory 151 stores program instructions and data 154 to control the operations of base station 101. Base station 101 also includes a RV handler 161 that handles the RV selection for the UEs.

FIG. 1 also shows a simplified block diagram of mobile station 103 in accordance to the current invention. Mobile station 103 has an antenna 135, which transmits and receives radio signals. An RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103.

Mobile station 103 includes several modules that carry out different tasks in accordance with embodiments of the current invention, including a repetition configurator 141, a RTI estimator 142, a RV selector 143, and a decoder 144. Repetition configurator 141 obtains a repetition configuration in the wireless communication system, wherein the repetition configurator configures each repetition for repeatedly transmitted information packets. RTI estimator 142 determines a RTI length for the repeatedly transmitted information packets. RV selector 143 receives information packets from a base station, wherein the information packets are transmitted repeatedly by a repetition number, and wherein a RV value is selected from a preconfigured RV sequence for each repeated transmission. Decoder 144 combines received each repetition of the information packets and decodes the information packets based on the repetition configuration.

Repetition Mechanism in Time Domain

In embodiments of this invention, a repeated transmission means an initial repeated transmission of an information packet, and a repeated retransmission of the information packet in case of failure decoding.

In one embodiment, a repeated transmission of an information packet can be implemented based on one time block in time domain. It means one repetition is performed within one time block and each repetition within one time block is self-decodable. Under such repetition mechanism, a repetition granularity in time domain is one time block. For easy description, such granularity is named as a repetition time interval (RTI). Moreover, such repetition scheme can be regarded as an inter-repetition mechanism based on one time block, or on a basic RTI. Subsequently, a repetition number of the transmitted information packet bits equals to a number of occupied time blocks with each carrying one repetition of the information packet. Here, a time block is a basic time unit at time domain. For example, a time block is a subframe in a LTE system.

FIG. 2 shows an example of a repeated transmission of an information packet by an inter repetition mechanism based on one time block. In this figure, an information packet 210 is repeatedly transmitted within a duration 230. Specifically, a repeated transmission of information packet 210 comprises a repetition 220 at time block 200, a repetition 211 at time block 201 and a repetition 213 at time block 202. Each repetition is different in the frequency domain.

In a second embodiment, an information packet is repeatedly transmitted within a set of resources distributed to a plurality of time blocks, i.e., a subset of the information packet is transmitted in a subset of resources within each time block. Under this repetition mechanism, the RTI length is more than one time block and each transmission in one time block within a longer RTI is not self-decodable. At the receiver side, the receiver can start to decode the information packet after the plurality of time blocks are received. This repetition scheme is an inter repetition mechanism based on a longer RTI comprising multiple time blocks. Transmissions within one longer RTI are considered as one repetition. For easy description, each transmission within one time block within the longer RTI is named as a part of one repetition.

FIG. 3 shows an illustration of a repeated transmission of an information packet by an inter repetition based on a longer RTI. An information packet 310 comprises two information subsets 311 and 312, and transmitted repeatedly within a duration 340. Specifically, subsets 311 and 312 are repeated within different time blocks. Repetition of subset 311 comprises a repetition 320 at time block 300, a repetition 323 at time block 302, and a repetition 325 at time block 304, while repetition of subset 312 comprises a repetition 321 at time block 301, a repetition 324 at time block 303 and a repetition 326 at time block 305. In this example, a transmission 320 of information subset 311 in time block 300 and a transmission 321 of information subset 312 in time block 301 constitute a complete repetition of the whole information packet 310 based on a longer RTI with two time blocks.

To support one-shot transmission of an information packet within one time block and to reduce the delay in the time domain, the information packet is repeatedly transmitted within one time block in a third embodiment. Further, such repetitions also repeat within a plurality of time blocks in case that multiple repetitions within one time block cannot compensate the coverage loss. Different from the inter repetition based on one or more time blocks, there are multiple repetitions of the information packet within one time block or a basic RTI.

Such repetition mechanism can improve power consumption at the receiver side due to a smaller latency. Further, scheduling at network will be simpler, since connected devices with a coverage loss are served in a time domain multiplexing scheme under such one shot transmission, considering connected devices are massive within a cell, and size of an information packet is quite small. To support such repetition mechanism, an indicator within a control signaling can be used to inform the receiver side in one embodiment.

FIG. 4 and FIG. 5 show some examples of a repeated transmission of an information packet based on the intra repetition mechanism and the inter repetition mechanism. In FIG. 4, a repeated transmission of an information packet 410 happens within a duration 440, wherein there are repetitions both within one time block and among time blocks. In this example, there are two repetitions within one time block. Within time block 400, there are repetitions 420 and 421. Moreover, there are repetitions 422 and 423 within time block 401, and repetitions 424 and 425 within time block 403. Such method uses both the intra repetitions and the inter repetitions for information packet 410.

FIG. 5 illustrates an exemplary diagram of an intra repetition within one time block. Different from FIG. 4, there are only intra repetitions within one time block in FIG. 5. In detail, a repeated transmission of information packet 510 only occurs in time block 501, where there are repetitions 520, 521, 522, and 523 at different locations in frequency domain.

The time blocks for a repeated transmission can be contiguous in time domain in one embodiment, or discrete in time domain in another embodiment. At the receiver side, the receiver should determine which time block is occupied for a repeated transmission before reception.

Resource Allocation for a Repeated Transmission

A resource size is assumed identical for one transmission, which is one complete repetition, a part of one repetition, or multiple repetitions in each occupied time block, in this invention. However, physical resource location of each transmission in frequency domain within each occupied time block can be different. In one embodiment, physical resource locations of other transmissions in frequency domain are identical to the first physical resource location for the first transmission within the first time block, which is a starting point of a repeated transmission. In another embodiment, physical resource location within other occupied time blocks are a predefined function of a first physical resource location in a first time block. Specifically, parameters of the predefined function comprise a starting index of the first physical resource location in frequency domain, and the index of occupied time blocks for repetitions. An example function of this predefined function is as follow $$R_n^{start} = (R_{1st}^{start} + I_n) \mod N_{BW} \qquad \text{Eq. (1)}$$

wherein $R_n^{start}$ and $R_{1st}^{start}$ denote a start point of a physical resource location within n-th time block and 1$^{st}$ time block during a repeated transmission, and $N_{BW}$ is a channel bandwidth. From this example, physical resource locations of other time blocks can be obtained by adding a shift based on the index of time block to the first physical resource location within the first time block.

Figure 6:
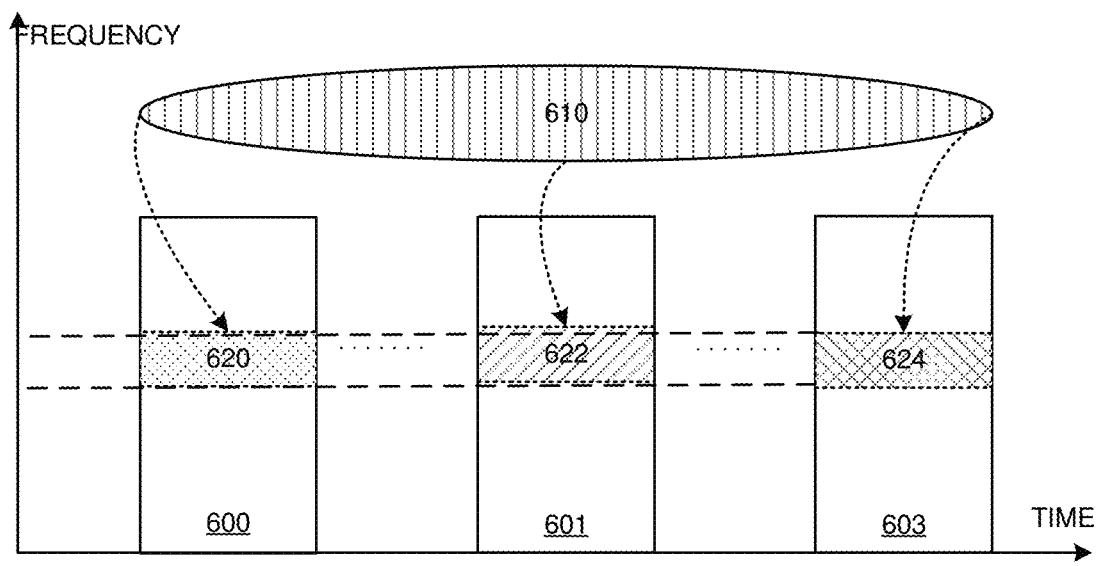
FIG. 6 shows an illustration example of physical resource location with the same frequency location under a repeated transmission.
Figure 7:
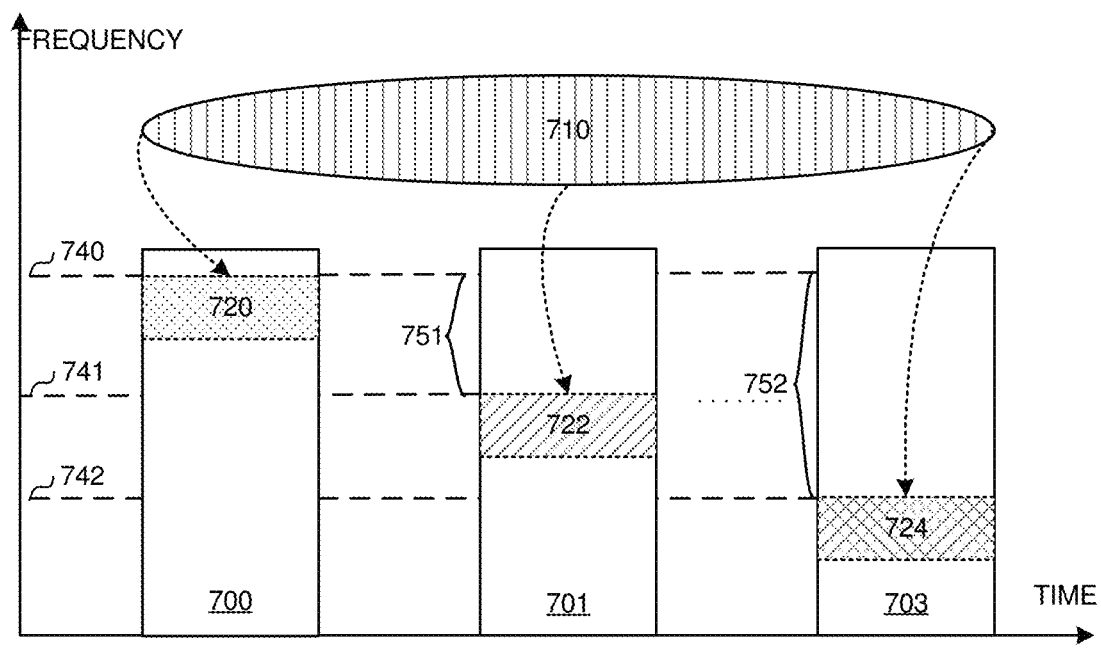
FIG. 7 shows an illustration example of physical resource location with different frequency location under a repeated transmission.

The first physical resource location is obtained by an indicator within a control signaling in one embodiment, or predefined in another embodiment. FIG. 6 and FIG. 7 show illustrations of physical locations of resources within different occupied time blocks for a repeated transmission.

In FIG. 6, an information packet 610 is repeatedly transmitted by a repetition 620 in time block 600, a repetition 622 in time block 601 and a repetition 624 in time block 603. Specifically, resource locations of repetitions 620, 622 and 624 are identical in frequency domain.

In FIG. 7, an information packet 710 is repeatedly transmitted by a repetition 720 in time block 700, a repetition 722 in time block 701 and repetition 724 in time block 703. Physical resource location 741 for repetition 722 is obtained by adding a shift 751 which is with a value 2 to physical resource location 740 of repetition 720, while physical resource location 742 of repetition 724 is obtained by adding a shift 752, which is with value 6 to 740.

Figure 8:
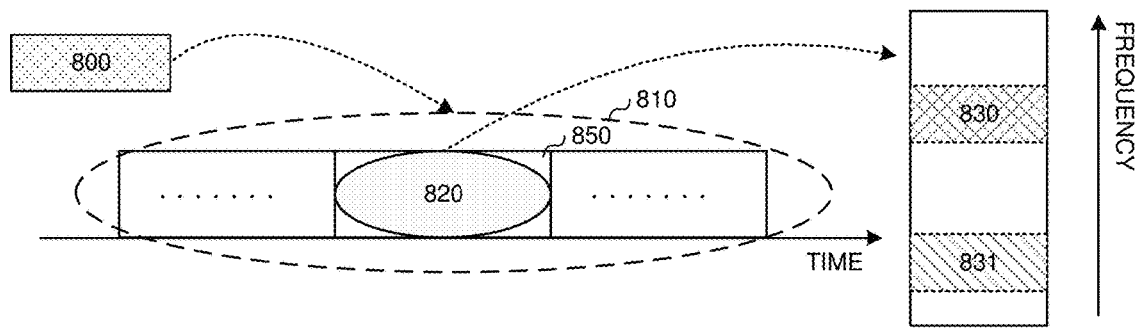
FIG. 8 shows an illustration example of resource allocation of an inter repetition within one time block.
Figure 9:
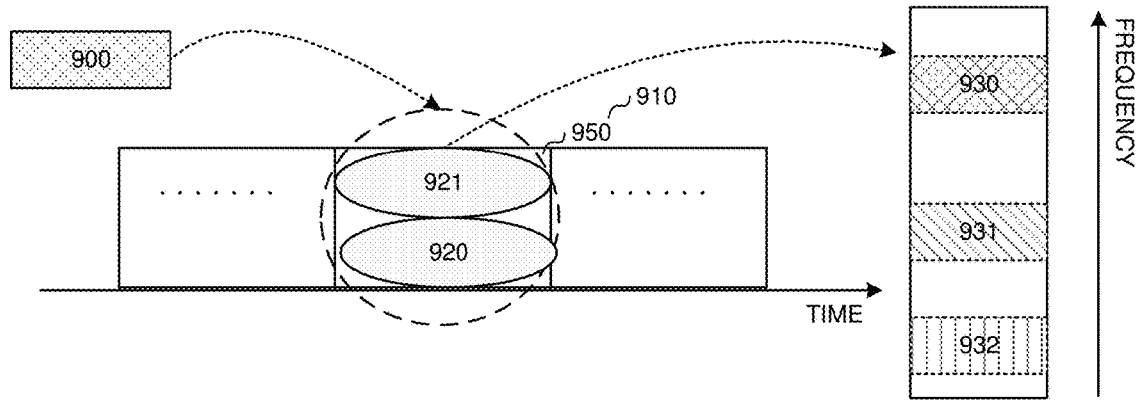
FIG. 9 shows an illustration example of resource allocation of an intra repetition within one time block.
Figure 10:
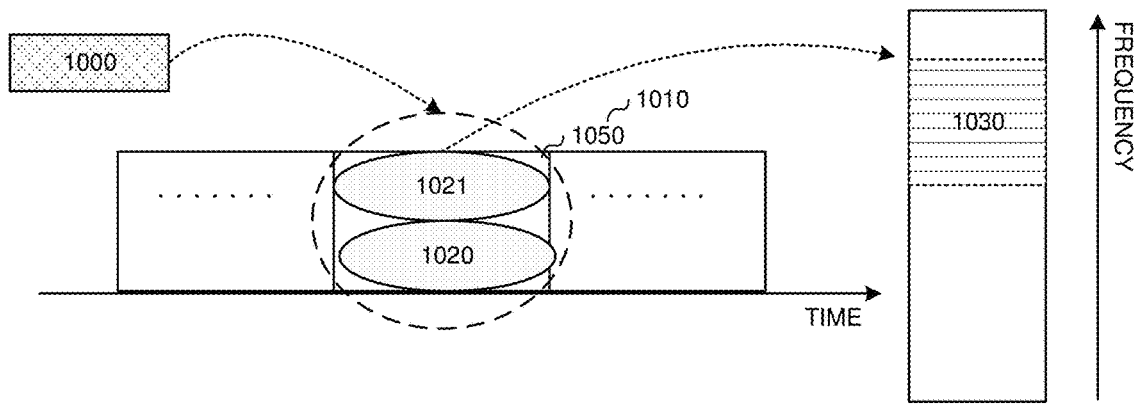
FIG. 10 shows an illustration example of resource allocation of an intra repetition within one time block with contiguous frequency allocation.

Further, resources within one time block can be discrete in one embodiment and contiguous in another embodiment. Some examples are shown in FIG. 8~FIG. 10. In FIG. 8, an information packet 800 is transmitted repeatedly by an inter repetition 810 based on one time block. Resources for one repetition 820 in time block 850 comprise two subsets 830 and 831, and these two subsets of resources are discrete in frequency domain. In FIG. 9, an information packet 900 is repeatedly transmitted by an intra repetition 910, and there are two repetitions within one time block. Specifically, in time block 950, resources for two repetitions 920 and 921 are distributed into three subsets of resources 930, 931 and 932 in frequency domain. In FIG. 10, for an intra repetition 1010 for an information packet 1000, there are two repetitions in one time block. Specifically, resources 1030 in frequency domain for repetitions 1020 and 1021 in time block 1050 are contiguous.

Except for the resources in frequency domain, the receiver should also determine which time block to detect for reception. In one embodiment, time blocks for a repeated transmission of an information packet are discrete in time domain. In another embodiment, a set of contiguous time blocks is used for a repeated transmission.

RE Mapping/Rating Matching for a Repeated Transmission

Under an inter repetition mechanism based on a longer RTI, the length of a symbol sequence, which is generated from an information packet to be transmitted, depends on the size of overall resources within a longer RTI, wherein the overall resources comprise multiple subsets of resources with an identical size and located in occupied time blocks within a longer RTI, in one embodiment. Then, the symbol sequence is divided into multiple parts equally, wherein a length of each part depends on a size of resources within one time block, and each part is transmitted in one time block within a longer RTI.

FIG. 11 shows an example of signal generation for an inter repetition based on a long RTI. In this figure, a symbol sequence 1101 with a length 1110 is generated from an information packet 1100, and the symbol sequence comprises two parts 1103 with a length 1111 and 1104 with a length 1112. One repetition of 1101 comprises two time blocks, i.e., 1103 and 1104 are repeatedly transmitted within different time blocks. Specifically, 1103 is repeatedly transmitted by repetitions 1130 at time block 1150, 1132 at time block 1152 and 1134 at time block 1154, while 1104 is repeatedly transmitted by repetitions 1131 at time block 1151, 1133 at time block 1153 and 1135 at time block 1155. The length value 1110 of symbol sequence 1101 depends on the size 1142 of overall resource for one complete repetition within two time blocks, wherein the overall resources comprise resource 1140 and resource 1141. Sizes of overall resources for each longer RTI (time block 1150, 1151, 1152, 1153, 1154, and 1155) are identical.

Under an intra repetition mechanism, a basic resource granularity is proposed for one repetition of the information packet. Specifically, a length of a symbol sequence generated from the information packet depends on a size of the basic resource granularity in one embodiment. There is one or multiple of such basic resource granularities within one time block to support one-shot transmission.

The basic resource granularity is predefined between eNB and UE, and fixed during the entire repeated transmission in one embodiment. In another embodiment, the basic resource granularity is given by a control signaling, or in some cases, the basic resource granularity is adjusted dynamically. In a third embodiment, the basic resource granularity is indicated by a higher layer signaling and changes semi-statically.

FIG. 12 gives an example of signal generation for an intra repetition mechanism. In this example, an information packet 1200 is repeatedly transmitted by a one-shot transmission within time block 1201 by 4 repetitions. Specifically, a symbol sequence 1201 with a length 1210 generated from 1200 is repeatedly 4 times within 4 subsets of resources 1220, 1221, 1222 and 1223, while the size of each subset of resource is size 1230. Further, the length 1210 is determined by size 1230. In this example, 1220, 1221, 1222 and 1223 are four basic resource granularities with size 1230.

To support such repetition within one time block, the size of the basic resource granularity and the size of the information packet should be determined. The sizes are indicated in a control signaling, while the sizes are same for all repetitions within different occupied time blocks within one repeated transmission. Note that one size of the basic resource granularity corresponds to the size of one information packet and such relationship is specified in one embodiment, and corresponds to multiple sizes of one information packet in another embodiment.

In another embodiment, the basic resource granularity is predefined with a specific size, and several sizes of an information packet. Under this design, the sizes of the information packet are indexed and indicated by an indicator within a control signaling for transmission.

Figure 14:
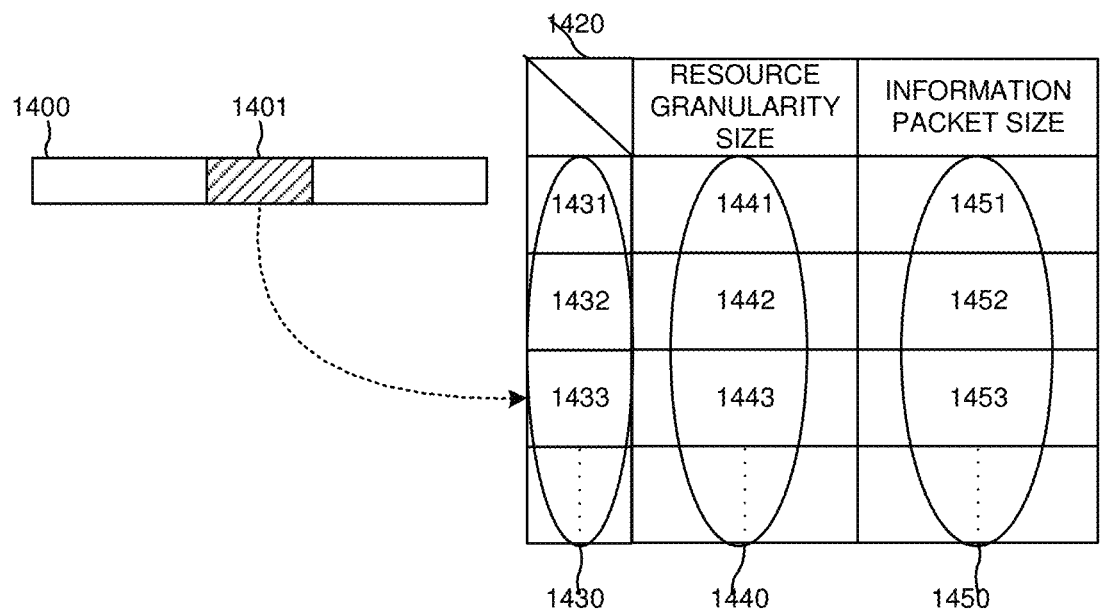
FIG. 14 shows an illustration example of determining a resource granularity under an intra repetition mechanism using an index.
Figure 15:
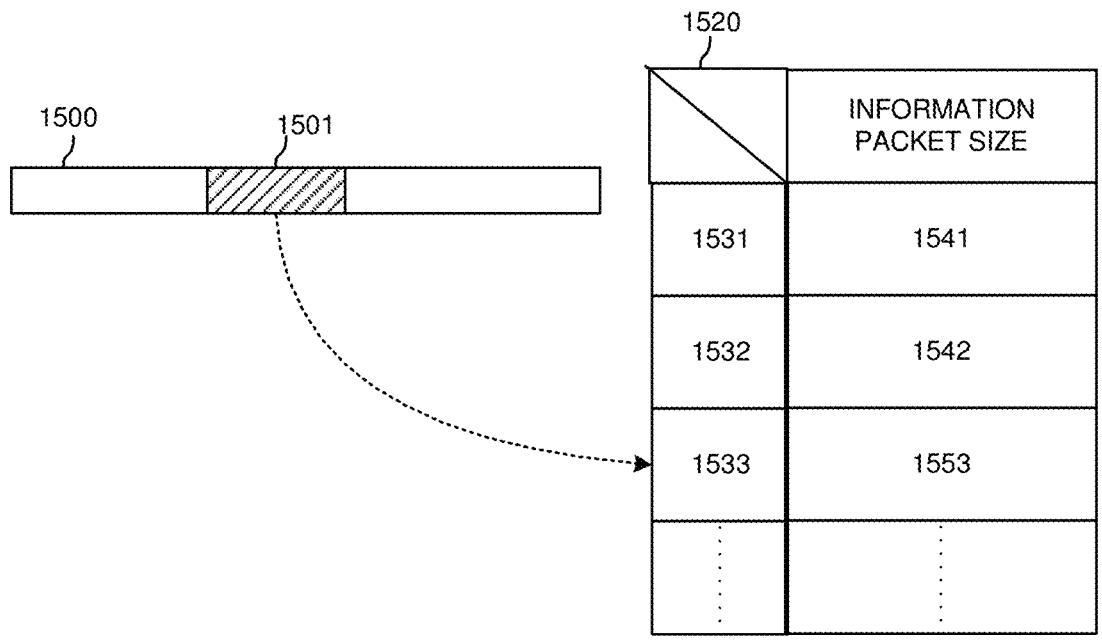
FIG. 15 shows an illustration example of determining a resource granularity under an intra repetition mechanism with a predefined size.

FIG. 13 to FIG. 15 show illustrations of designing a resource granularity under an intra repetition mechanism. In FIG. 13, a table 1300 about the sizes for a basic resource granularity and information packet is predefined. In the table, block 1310 denotes sizes for a basic resource granularity with values 1311~1315, while block 1330 denotes sizes for an information packet with values 1331~1334. Block 1320 is indices for sizes of information packet 1321~1323. An indicator 1341 within a control signaling 1340 will indicate a size of an information packet to the receiver side, and another indicator 1342 informs the receiver the size of the resource granularity.

In FIG. 14, an indicator 1401 within a control signaling 1400 carries an index value for a receiver side to determine a size of an basic resource granularity and also a size for an information packet, and the receiver can determine detail values by checking a table 1420. For this example, sizes of the basic resource granularity and information packet are indexed with a one-to-one mapping relationship. Specifically, in table 1420, block 1440 with sizes 1441, 1442 and 1443 corresponds to information packet sizes 1450 with value 1451, 1452, and 1453 wherein size 1441~1443 and 1451~1453 are indexed in the table 1420 by indices 1431, 1432, and 1433 in the size block 1430. In FIG. 15, an indicator 1501 within a control signaling 1500 carries an index value to determine the size of the information packet. Predefined sizes for an information packet are 1541, 1542, 1543, and indexed in a table 1520 by indices 1531, 1532, and 1533. A receiver side can determine the size by an indicator 1501 within a control signaling. In this example, a size of a basic resource granularity is predefined.

To accommodate multiple repetitions within one time block, a reserved set of resources within one time block is predefined in one embodiment. In another embodiment, a set of resources is indicated by the control signaling. The size of overall resources for multiple repetitions within one time block is multiple of the size of the basic resource granularity.

To map symbols to available REs in case there are multiple repetitions within one time block, a symbol sequence generated from the information packet is mapped to available REs in one embodiment. Such mapping scheme can be regarded as a sequence-level mapping or a sequence-level repetition. In another embodiment, symbols within the sequence are repeatedly one by one. Different from the sequence-level repetition, such repetition can be named as a symbol-level mapping.

Figure 16:
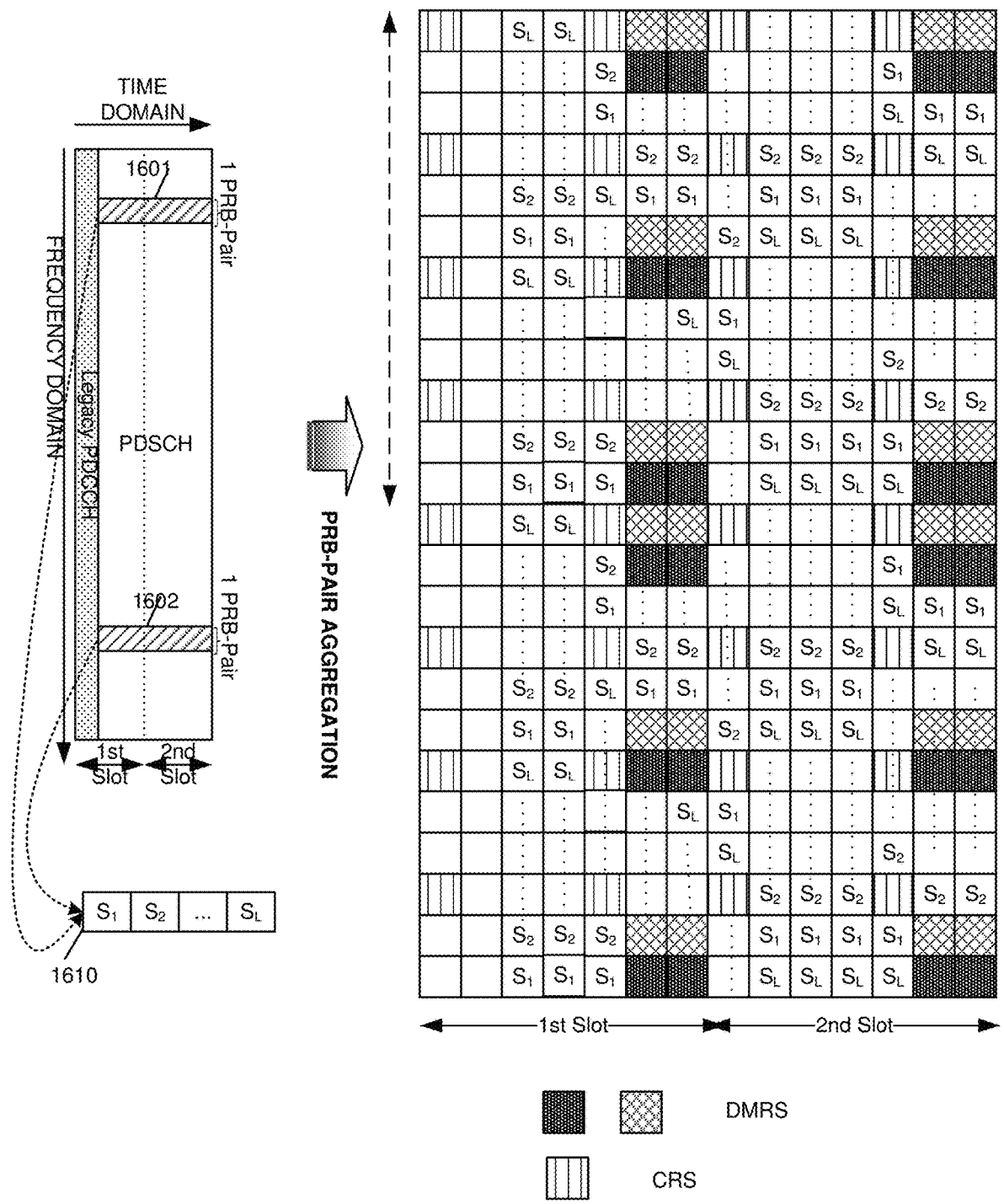
FIG. 16 shows an illustration example of RE mapping under a repeated transmission.
Figure 17:
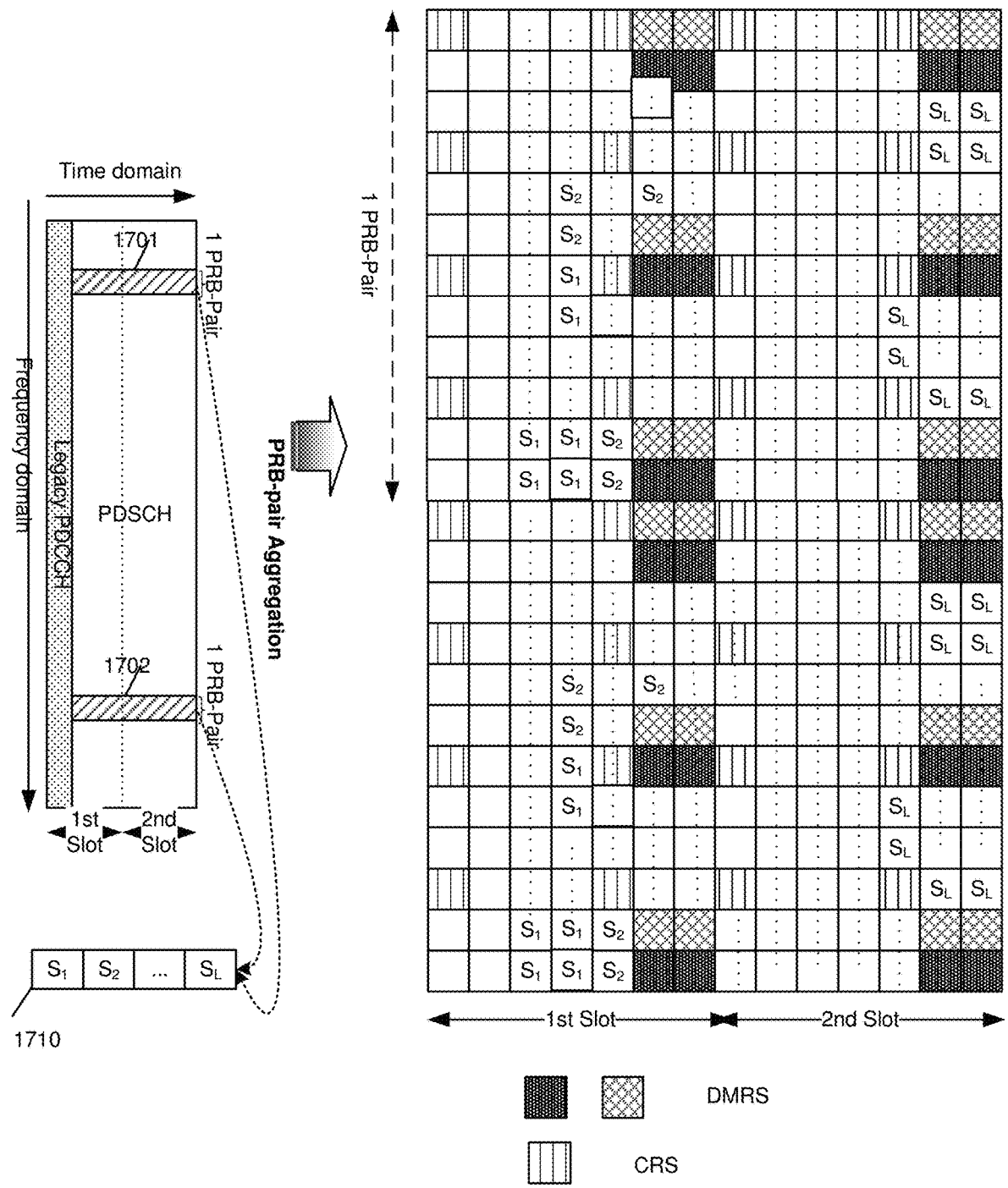
FIG. 17 shows an illustration example of a symbol-level mapping scheme.

Some examples are given in FIG. 16 and FIG. 17. In FIG. 16, a symbol sequence 1610 with a length L is repeatedly transmitted by repetitions 1601 and 1602 at different frequency locations within one time block, wherein each repetition occupies one pair of PRB. Here, LTE system is considered. In this example, the symbol sequence is repeatedly mapped to available resources. In FIG. 17, a symbol sequence 1710 with a length L is repeatedly transmitted by repetitions 1701 and 1702 at different frequency locations within one time block, wherein each repetition occupies one PRB pair, based on LTE system. In this example, symbols within 1710 are mapped repeatedly one by one to available resources.

The mapping scheme is specified in one embodiment. No matter which mapping scheme is applied, a repetition number within one time block depends on the size of overall resources and the size of the basic resource granularity. Alternatively, the repetition number can be expressed by the size of overall resources within one time block and a length of the symbol sequence. An example function is given as follow $$N_{intra} = \lfloor N_{RE} / N_{symb} \rfloor \qquad \text{Eq. (2)}$$

wherein $N_{RE}$ denotes a resource size expressed by a number of available REs within one time block, $N_{symb}$ is a number of symbols or a sequence length.

Transmission Scheme and Reception Procedure

In a wireless communication system, a receiver side, either a terminal or a base station, need to combine received data for decoding under HARQ retransmission, wherein a same redundancy version (RV) or different RVs will be used for retransmissions, compared to an initial transmission of a data packet or a sequence of information bits. Taking LTE system as an example, RV value for downlink transmission is indicated by the control signaling, carried by PDCCH. Alternatively, RV value can be predefined for uplink transmission.

To support a repeated transmission of an information packet, a RV sequence is repeatedly used for symbol generation in one embodiment, wherein elements within the RV sequence are different from each other, or some elements within the RV sequence share the same value. If all elements within the RV sequence are identical, only one RV value is used for repetitions actually, i.e., RV values for all repetitions are identical.

For a repeated retransmission of the information packet, a second RV sequence different from a first RV sequence for an initial repeated transmission can be used. Each RV sequence for each retransmission can be different or identical. The length of the RV sequence is less than or equal to the repetition number. The RV sequence is used repeatedly. If the length of the RV sequence is equal to one, it means only one RV is used for all repetitions within a repeated transmission or retransmission. One RV value can be used to multiple consecutive repetitions (for example, X repetitions), and all RV values within the sequence are cycled by each X repetitions.

Figure 18:
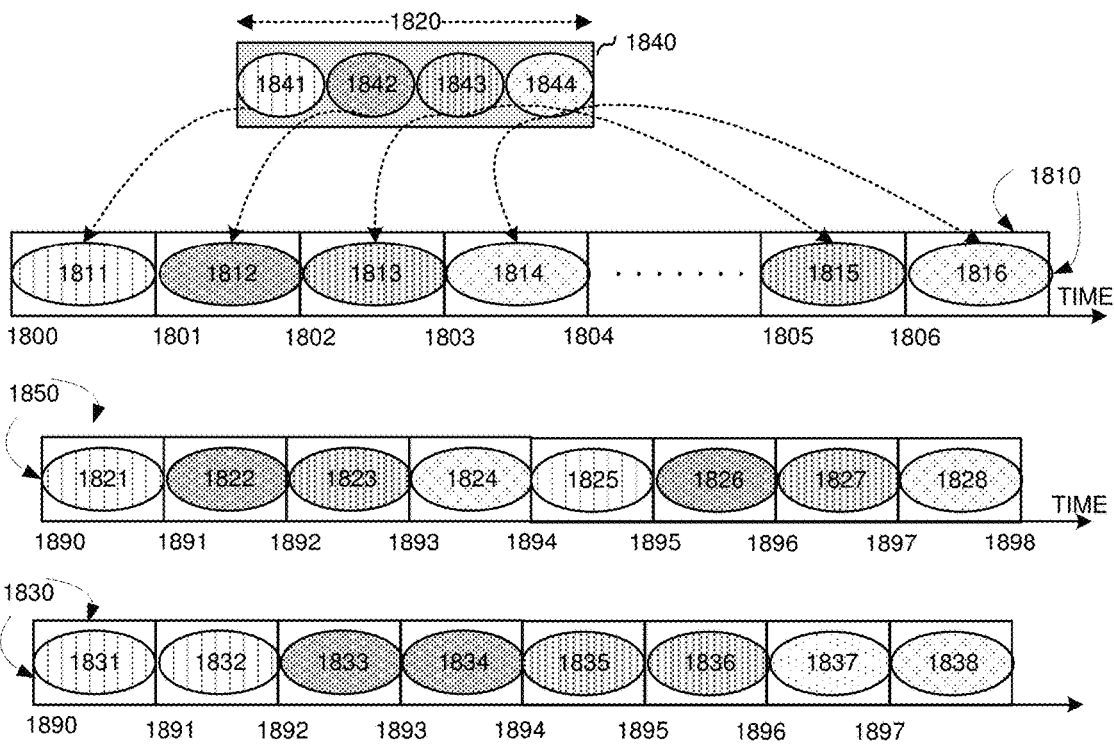
FIG. 18 shows an illustration example of a RV sequence for a repeated transmission where the repetition number is a multiple of the RV sequence length.
Figure 19:
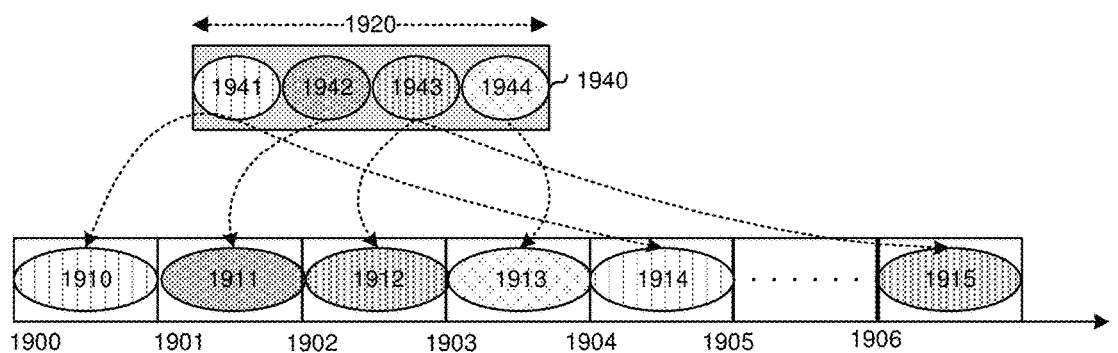
FIG. 19 shows an illustration example of a RV sequence for a repeated transmission where the repetition number is not a multiple of the RV sequence length.

In one novel aspect, a RV sequence is selected from a predefined set of RV sequences for the repeated transmission. In one embodiment, the RV sequence with one or more RV values are repeatedly used for the repeated transmission, by applying each RV value one by one to one block of repetitions cyclically. In one embodiment, each scrambling sequence is the same for its corresponding RV value in the RV sequence for the repetition transmission. As such, at the receiver side, the symbol-level can be used before demodulation. In another embodiment, the RV sequence with one or more RV values is repeatedly used for the repeated transmission, by applying each RV value one by one to one repetition cyclically. FIG. 18 and FIG. 19 show some examples of a repeated transmission with a predefined RV sequence.

In FIG. 18, a RV sequence 1840 with a length 1820 comprising RV elements 1841, 1842, 1843, and 1844 is repeatedly used for a repeated transmission 1810. Specifically, different symbol sequences are generated by different RV values. RV element 1841 is used for a repetition 1811 at time block 1800; RV element 1842 is used for a repetition 1812 at time block 1801; RV element 1843 is used for repetitions 1813 and 1815 at time blocks 1802 and 1805; RV element 1844 is used for repetitions 1814 and 1816 at time blocks 1804 and 1806. In this example, a repetition number of the repeated transmission 1850/1830 is a multiple of the RV sequence length 1820.

In one embodiment of repetition 1850, the RV sequence is repeatedly used for the repeated transmission by applying each RV value one by one to one repetition cyclically. The RV sequence 1840 with length 1820 comprising RV elements 1841, 1842, 1843, and 1844 is repeatedly used for a repeated transmission 1820. Specifically, different symbol sequences are generated by different RV values. RV element 1841 is used for a repetition 1821 at time block 1890; RV element 1842 is used for a repetition 1822 at time block 1891; RV element 1843 is used for repetition block 1823 and 1892. RV element 1844 is used for repetition block 1824 at 1893. After the end of the RV sequence, the RV sequence is cyclically applied to the rest of repetition blocks. RV element 1841 is used for a repetition 1825 at time block 1894; RV element 1842 is used for a repetition 1826 at time block 1895; RV element 1843 is used for repetition block 1827 and 1896. RV element 1844 is used for repetition block 1828 at 1897. In one example, the RV sequence used for repeated transmission 1850 are same as the RV sequence used for repeated transmission 1810.

In another embodiment, the RV sequence is repeatedly used for the repeated transmission by applying each RV value one by one to one block of repetitions cyclically. Specifically, each RV value is repeated used for a block of repetition cyclically. For example, repetition transmission 1830 uses RV sequence 1840 by applying the RV value of 1840 one to one block of repetition cyclically. RV element 1841 is used for a repetition 1831 and 1832 at time block 1890 and 1891. RV element 1842 is used for a repetition 1833 and 1834 at time block 1892 and 1893. RV element 1843 is used for a repetition 1835 and 1836 at time block 1894 and 1895. RV element 1844 is used for a repetition 1837 and 1838 at time block 1896 and 1897.

In FIG. 19, a RV sequence 1940 with a length 1920 comprising RV elements 1941, 1942, 1943, and 1944 is repeatedly used for a repeated transmission 1990. Specifically, different symbol sequences are generated by different RV values. RV element 1941 is used for a repetition 1910 and 1914 at time block 1900 and 1904; RV element 1942 is used for a repetition 1911 at time block 1901; RV element 1943 is used for repetitions 1912 and 1915 at time blocks 1902 and 1906; RV element 1944 is used for repetitions 1913 at time blocks 1903. In this example, a repetition number of the repeated transmission is not a multiple of RV sequence length 1920, and RV element 1943 is also used for the last repetition 1915.

Under an inter repetition mechanism based on a basic RTI or a longer RTI, only one RV is used for one repetition within the basic RTI or the longer RTI. Under an intra repetition mechanism, one RV is used for multiple repetitions within one time block in one embodiment. In another embodiment, a RV sequence is used repeatedly for the whole repetition, i.e., different RV values are applied for different repetitions within one time block.

Figure 20:
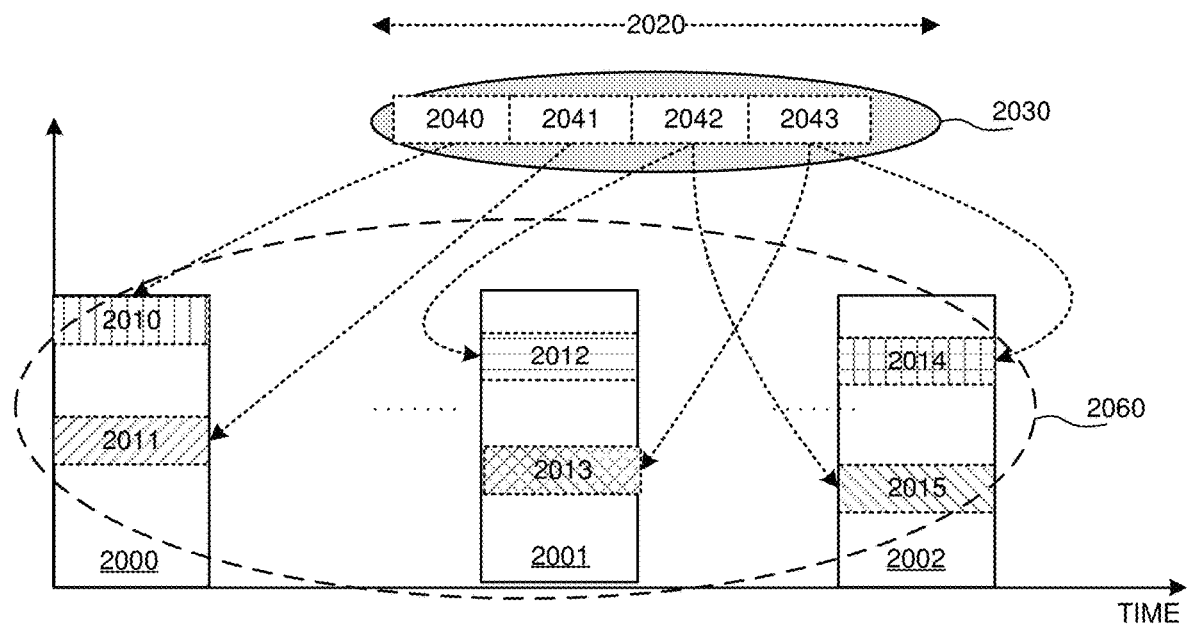
FIG. 20 shows an illustration example of a RV sequence for a repeated transmission where the repetition number is a multiple of the RV sequence length.
Figure 21:
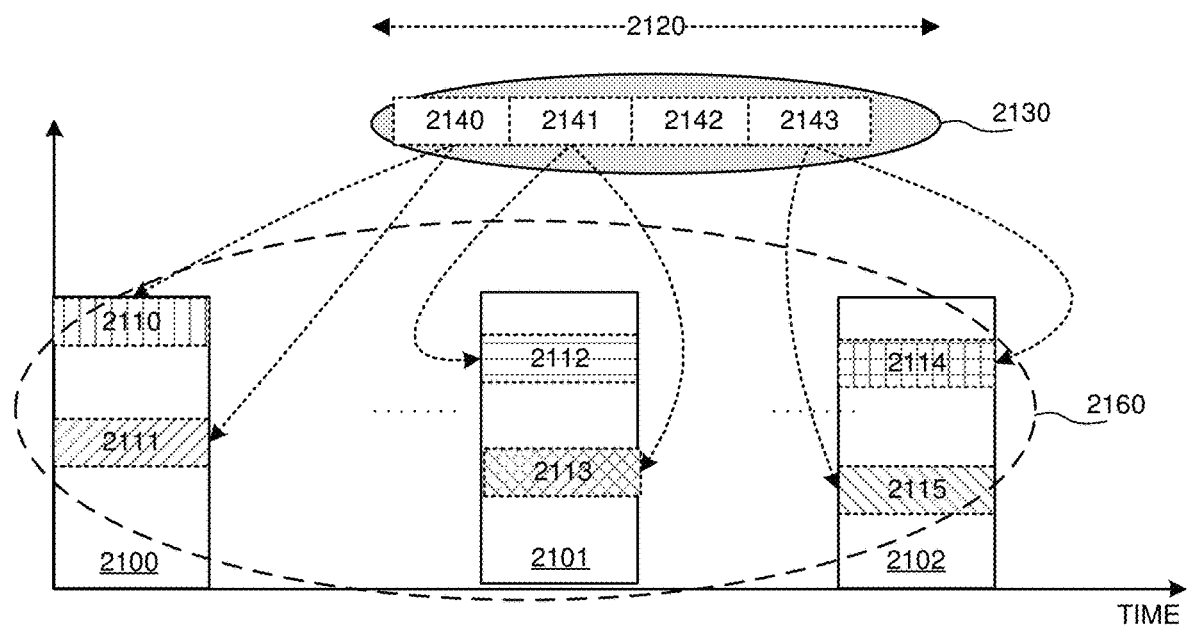
FIG. 21 shows an illustration example of a RV sequence for a repeated transmission where the repetition number is not a multiple of the RV sequence length.

FIG. 20 and FIG. 21 show examples of an intra repetition with a RV sequence. In FIG. 20, a RV sequence 2030 with a length 2020 is used for a repeated transmission 2060, wherein 2060 is based on an inter repetition and an intra repetition. Moreover, RV sequence 2030 comprises multiple RV elements 2040, 2041, 2042 and 2043, and these RV elements are used for different repetitions. In this example, the whole RV sequence is used repeatedly by applying different RV values for different repetitions within one time block, i.e, RV values one by one are used for repetitions cyclically. RV element 2040 is used a repetition 2010 at time block 2000, and RV element 2041 is used for another repetition 2011 at time block 2000, RV element 2042 is used for a repetition 2012 at time block 2001, and repetition 2015 at time block 2002, and RV element 2043 is used for another repetition 2013 within the same time block 2001, and repetition 2014 at time block 2002. Last two repetitions 2014 and 2015 within time block 2002 are based on RV element 2043 and 2042 respectively, since repetition number of 2060 is multiple of 2020.

In FIG. 21, a RV sequence 2130 with a length 2120 is repeatedly used for a repetition 2160. Specifically, a RV element 2140 is used for repetitions 2110 and 2111 within time block 2100; a RV element 2141 is used for repetitions 2112 and 2113 at time block 2101; a RV element 2143 is used for repetitions 2114 and 2115 within time block 2102. Note that the number of occupied time blocks for 2160 is multiple of 2120, and the last RV element 2143 within 2130 is used for repetitions within the last occupied time block 2102 of 2160.

If each RV value for each repetition is identical, and each scrambling sequence for each repetition is identical. A repeated transmission means a same symbol sequence is repeatedly transmitted in one embodiment. It can be regarded as an identical repetition. To generate a scrambling sequence for all repetitions, the scrambling sequence can be a function of a first time block index, wherein the first time block is a starting point for a repeated transmission or retransmission. In another embodiment, different symbol sequences, which are generated from the same information packets are transmitted in different repetitions. Here, different symbol sequences means different RV values are applied to explore a coding gain, or different scrambling sequences are used to randomize interference. It is assumed that a modulation order remains identical during repetitions for above designs.

To determine a RV sequence, a set of RV sequences is predefined and an indicator within a control signaling informs the receiver side about the used RV sequence implicitly in on embodiment. At the receiver side, the receiver can determine the used RV sequence by checking a RV sequence index carried by the indicator. In another embodiment, a predefined rule is specified to get RV values for each repetition without any signaling.

Before to receive a repeated transmission of an information packet, at the receiver side, the receiver should first determine configurations for each repetition, wherein the configurations comprise scrambling sequence, RV value, and physical resources including locations in time domain and frequency domain, repetition mechanism (inter repetition or intra repetition). If an identical repetition is applied, the receiver can combine received symbols from different repetitions directly in one embodiment, i.e., a symbol-level combination is performed. The receiver can combine outputs after demodulation in another embodiment. If an identical repetition is not applied, the receiver should perform a combination after demodulation, i.e., a bit-level combination is performed, in a third embodiment.

A reception procedure at the receiver side in one embodiment can be described as follow Step 1: determining configurations for each repetition based on control signaling or some predefined rules, like physical resource, scrambling sequence, RV sequence, etc.

Step 2: receiving repetitions one by one at corresponding frequency-time resources.

Step 3: determining whether it is possible to perform a symbol-level combination among repetitions?
  If yes, performing a symbol-level combination among received repetitions (Step 4), and then going to Step 6.
  If not, demodulating received data and obtaining a combination output by combining each demodulation output of each repetition (Step 5), and then going to Step 7.

Step 6: combining the received symbols and performing demodulation, and then going to step 7.

Step 7: combining the demodulation output and decoding based on output in Step 5 or Step 6, and ending the procedure.

In another embodiment, a reception procedure at the receiver side in one embodiment can be described as follow Step 1: determining configurations for each repetition based on control signaling or some predefined rules, like physical resource, scrambling sequence, RV sequence, etc.

Step 2: receiving repetitions one by one at corresponding frequency-time resources.

Step 3: demodulating each received repetition

Step 4: combining each demodulation output of each received repetition.

Step 5: decoding received data based on a combination output in Step 4.

Note that at the receiver side, the receiver can perform decoding by receiving some repetitions, without receiving all repetitions, to reduce time delay in a realistic system in one embodiment. If a successful decoding achieved, for example, CRC check is passed, the receiver can determine a successful reception of transmitted data, and can stop to receive rest repetitions.

Figure 22:
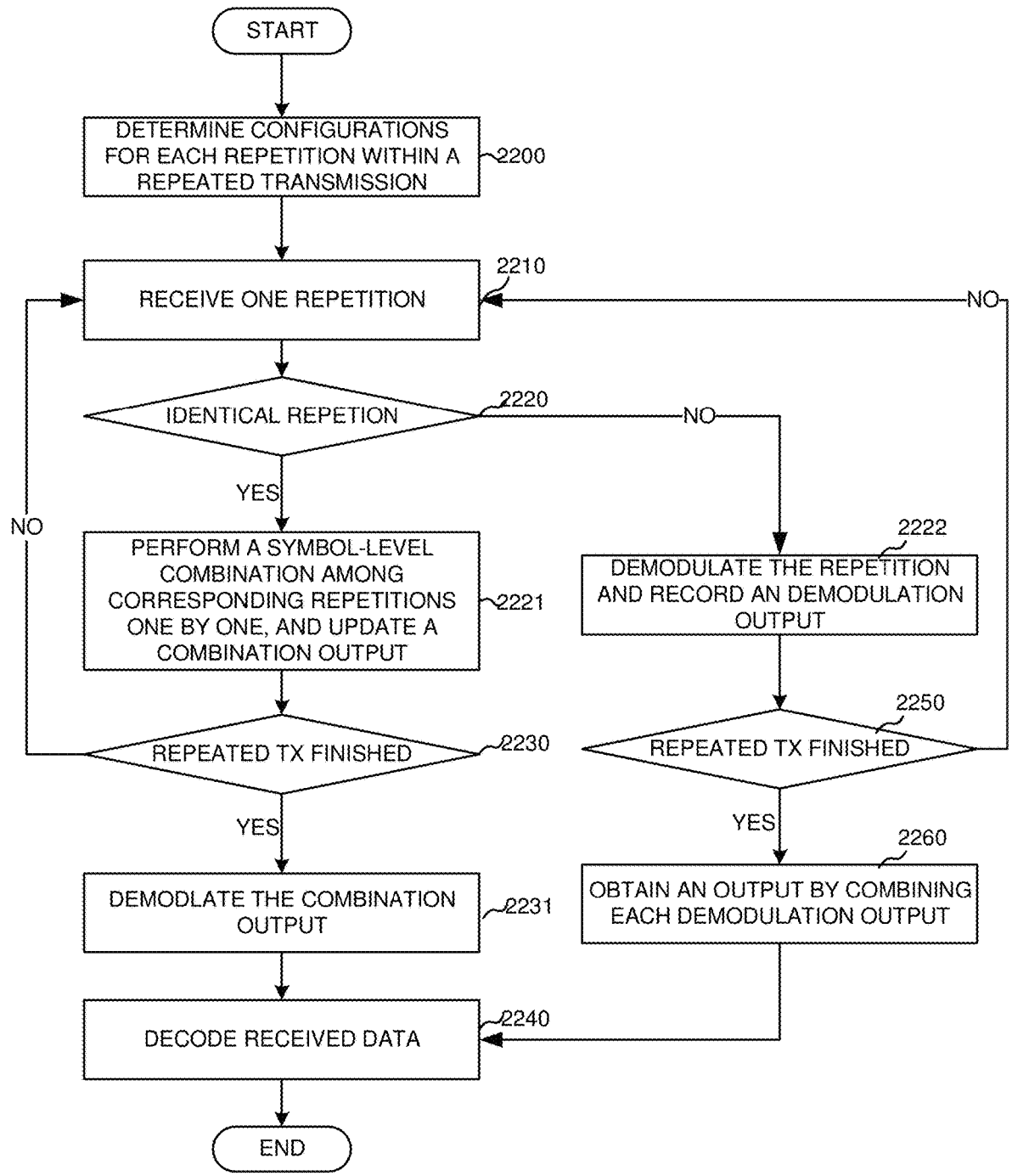
FIG. 22 shows an illustration example of reception procedure under a repeated transmission where a symbol level combination may be selected.
Figure 23:
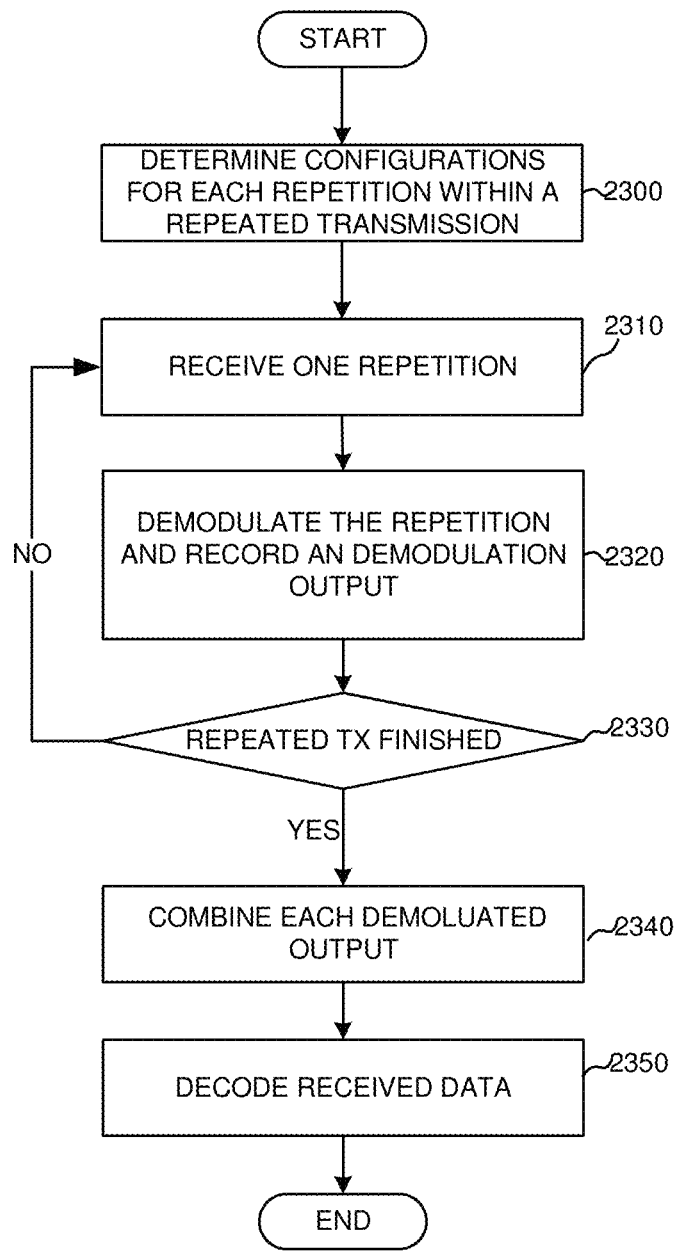
FIG. 23 shows an illustration example of reception procedure under a repeated transmission.

FIG. 22 and FIG. 23 illustrate examples of a procedure of decoding an information packet under a repeated transmission. In FIG. 22, at the receiver side, the receiver determines configurations for each repetition within a repeated transmission in Step 2200 before performing reception, and then starts to receive each repetition (Step 2210). If yes, go to a determination that an identical repetition is applied for the repeated transmission in Step 2220, which means that current receiving repetition is identical as the received repetitions previously, the receiver will combine received repetitions by a symbol-level combination (Step 2221). Then, the receiver will judge whether the repetition finishes (Step 2230). If not to Step 2230, the receiver will continue to receive rest repetitions. If yes to Step 2230, a demodulation will be performed based on the symbol-level combination output (Step 2231). Further, received data will be decoded (step 2240) by inputting the demodulation output in Step 2231. If no in Step 2220, the receiver will demodulate each received repetition and buffer each demodulation output (Step 2222). Then, the receiver will judge whether the repetition finishes (Step 2250). If not in Step 2250, the receiver will continue to receive rest repetitions, which is to go back to step 2210. If yes in Step 2250, an output will be obtained for data decoding (step 2240) by combining each demodulation output of each repetition (Step 2260). In one example, decoding in step 2240 needs to combine the demodulation output and decoding based on output in Step 2231 and Step 2260, and ending the procedure.

In FIG. 23, before receiving each repetition (Step 2310), at the receiver side, the receiver determines configurations for each repetition within a repeated transmission firstly (Step 2300). After receiving one repetition in step 2310, a demodulation of the received repetition is performed and each output is buffered (Step 2320). Then, the receiver will determine whether all repetitions are received (Step 2330). If yes in Step 2330, a decoding will be performed (Step 2350) by combining each demodulation output (Step 2340) and the whole procedure stops. If not in Step 2330, the receiver continues to receive repetitions, that means to go to step 2310.

Figure 24:
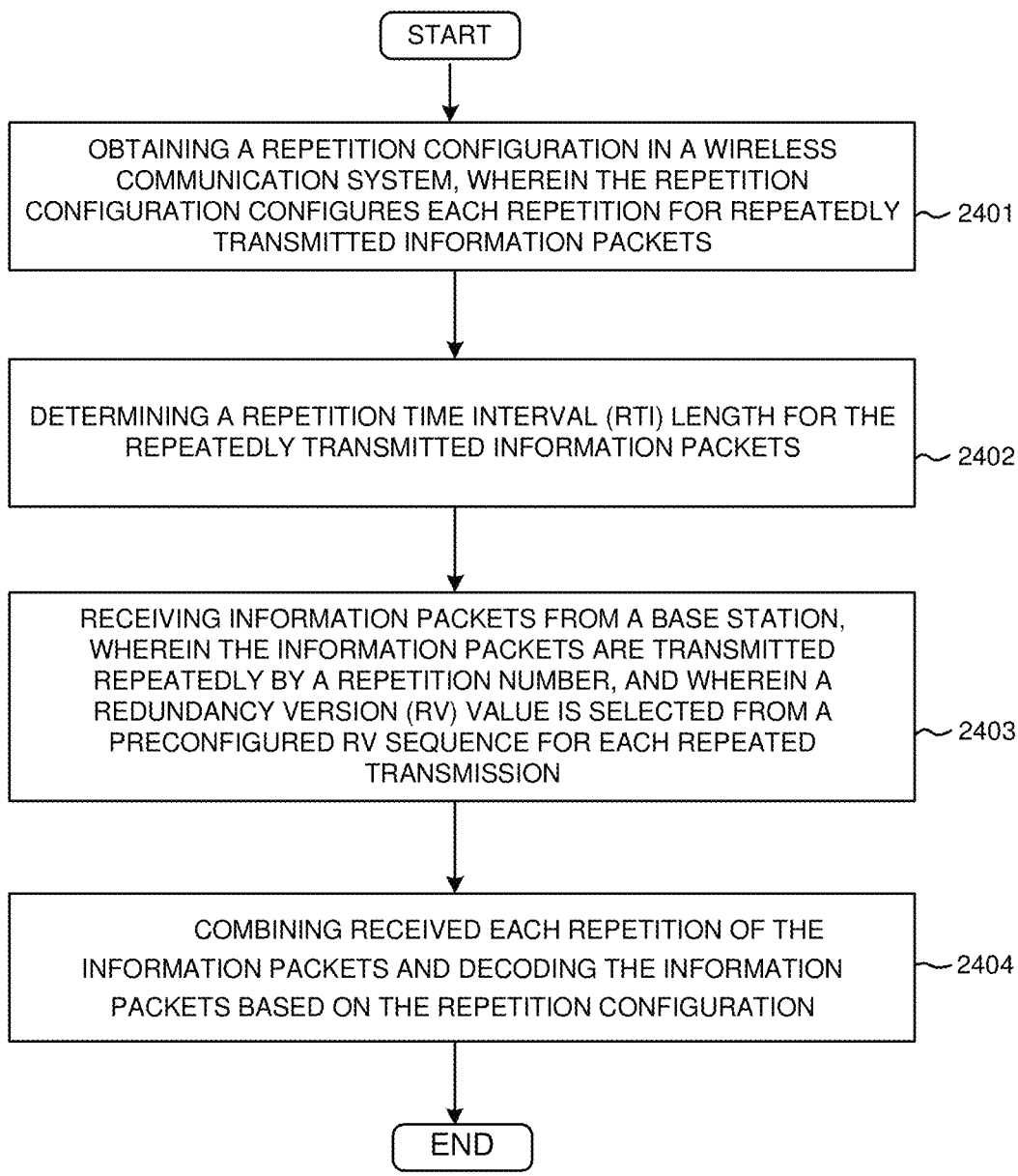
FIG. 24 illustrates an exemplary flow chart of the repetition design using predefined RV sequences in accordance with embodiments of the current invention.

FIG. 24 illustrates an exemplary flow chart of the repetition design using predefined RV sequences in accordance with embodiments of the current invention. At step 2401, the UE obtains a repetition configuration in a wireless communication system, wherein the repetition configuration configures each repetition for repeatedly transmitted information packets. At step 2402, the UE determines a RTI length for the repeatedly transmitted information packets. At step 2403, the UE receives information packets from a base station, wherein the information packets are transmitted repeatedly by a repetition number, and wherein a RV value is selected from a preconfigured RV sequence for each repeated transmission. At step 2404, the UE combines received each repetition of the information packets and decoding the information packets based on the repetition configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
obtaining a repetition configuration by a user equipment (UE) in a wireless communication system, wherein the repetition configuration configures each repetition for repeatedly transmitted information packets;
determining a repetition time interval (RTI) length for the repeatedly transmitted information;
receiving information packets from a base station, wherein the information packets are transmitted repeatedly by a repetition number, and wherein a redundancy version (RV) value is selected from a preconfigured RV sequence for each repeated transmission n, and wherein the RV sequence is repeatedly used for the repeated transmission by (a) applying each RV value to one block of repetitions such that each block of repetitions has the same RV value, wherein the number of repetition blocks is determined by the repetition number, and (b) applying each RV value one by one to each repetition blocks cyclically; and
combining each received repetition of the information packets and decoding the information packets based on the repetition configuration.

2. The method of claim 1, wherein the repetition configuration includes one or more repetition parameters comprising: a scrambling sequence, a RV value, a physical resource location, and a repetition type.

3. The method of claim 1, wherein the RV sequence is repeatedly used for the repeated transmission, by applying the same RV value to one block of repetitions, and wherein a scrambling sequence is the same within the one block of repetitions.

4. The method of claim 1, wherein combining each received repetition of the information packets and decoding the information packets comprising:
collecting available resources within one or multiple repetitions in a contiguous way belonging to each one symbol within a transmitted symbol sequence, wherein the symbol sequence is generated from the information packet, if the one or multiple repetitions are determined as a symbol level repetition;
obtaining a received symbol by combining collected available resources from the one or multiple repetitions; and
demodulating received data by constructing received symbols one by one after combination;
combining each demodulation output from each one or multiple repetitions, and decoding the received information packet.

5. The method of claim 1, wherein combining each received repetition of the information packets and decoding the information packets comprising:
collecting available resources within one or multiple repetitions in a discrete way belonging to each symbol within a transmitted symbol sequence, wherein the symbol sequence is generated from the information packet, if the one or multiple repetitions are determined as a symbol level repetition;
obtaining a received symbol by combining collected available resources from the one or multiple repetitions; and
demodulating received data by constructing received symbols one by one after combination; and
combining each demodulation output from each one or multiple repetitions, and decoding the received information packet.

6. The method of claim 1, wherein combining each received repetition of the information packets and decoding the information packets comprising:
obtaining a received repetition by collecting available resources within one repetition at one time block belonging to a transmitted symbol sequence, wherein the symbol sequence is generated from the information packet, if the one repetition is determined as a bit-level repetition;
demodulating the each received repetition; and
decoding the received information packet by combining each output at each repetition.

7. The method of claim 1, wherein the repeated transmission is an intra repetition that repeatedly transmits the information packets within one RTI over different frequency domains.

8. The method of claim 7, further comprising:
determining an intra repetition mechanism by checking an indicator within a control signaling;
determining a basic resource granularity for one repetition under the intra repetition; and
receiving multiple repetitions within one RTI.

9. The method of claim 8, wherein a size of the basic resource granularity is indicated by an indicator within a control signaling for the information packet transmission.

10. A user equipment (UE), comprising:
a transceiver that transmits and receives radio signals in wireless network;
a memory; and
a processor coupled to the memory, the processor configured to obtain a repetition configuration and configure each repetition for repeatedly transmitted information packets;
determine a repetition time interval (RTI) length for the repeatedly transmitted information packets;
receive information packets from a base station, wherein the information packets are transmitted repeatedly by a repetition number, and wherein a redundancy version (RV) value is selected from a preconfigured RV sequence for each repeated transmission, and wherein the RV sequence is repeatedly used for the repeated transmission by (a) applying each RV value to one block of repetitions such that each block of repetitions has the same RV value, wherein the number of repetition blocks is determined by the repetition number, and (b) applying each RV value one by one to each repetition block cyclically; and
combine each received repetition of the information packets and decodes the information packets based on the repetition configuration.

11. The UE of claim 10, wherein the repetition configuration includes one or more repetition parameters comprising: a scrambling sequence, a RV value, a physical resource location, and a repetition type.

12. The UE of claim 10, wherein the RV sequence is repeatedly used for the repeated transmission, by applying the same RV value to one block of repetitions, and wherein a scrambling sequence is the same within the one block of repetitions.

13. The UE of claim 10, wherein combining each received repetition of the information packets and decoding the information packets comprising:
collecting available resources within one or multiple repetitions in a contiguous way belonging to each one symbol within a transmitted symbol sequence, wherein the symbol sequence is generated from the information packet, if the one or multiple repetitions are determined as a symbol level repetition;

obtaining a received symbol by combining collected available resources from the one or multiple repetitions; and demodulating received data by constructing received symbols one by one after combination;

combining each demodulation output from each one or multiple repetitions, and decoding the received information packet.

14. The UE of claim 10, wherein combining each received repetition of the information packets and decoding the information packets comprising:

collecting available resources within one or multiple repetitions in a discrete way belonging to each symbol within a transmitted symbol sequence, wherein the symbol sequence is generated from the information packet, if the one or multiple repetitions are determined as a symbol level repetition;

obtaining a received symbol by combining collected available resources from the one or multiple repetitions; and demodulating received data by constructing received symbols one by one after combination; and combining each demodulation output from each one or multiple repetitions, and decoding the received information packet.

15. The UE of claim 10, wherein combining each received repetition of the information packets and decoding the information packets comprising:

obtaining a received repetition by collecting available resources within one repetition at one time block belonging to a transmitted symbol sequence, wherein the symbol sequence is generated from the information packet, if the one repetition is determined as a bit-level repetition;

demodulating the each received repetition; and decoding the received information packet by combining each output at each repetition.

16. The UE of claim 10, wherein the repeated transmission is an intra repetition that repeatedly transmits the information packets within one RTI over different frequency domains.

17. The UE of claim 10, further comprising an intra-repetition handler that determines an intra repetition mechanism by checking an indicator within a control signaling, determines a basic resource granularity for one repetition under the intra repetition, and receives multiple repetitions within one RTI.

18. The UE of claim 17, wherein a size of the basic resource granularity is indicated by an indicator within a control signaling for the information packet transmission.

* * * * *